United States Patent

[11] 3,580,532

[72] Inventor Regis V. Schmitt
 Erie, Pa.
[21] Appl. No. 15,787
[22] Filed Mar. 2, 1970
[45] Patented May 25, 1971
[73] Assignee Lord Corporation
 Erie, Pa.

[54] TRUNNION MOUNTING
 4 Claims, 5 Drawing Figs.
[52] U.S. Cl. ..................................... 248/9,
 180/64, 248/26
[51] Int. Cl. ..................................... B60k 1/00
[50] Field of Search ........................... 248/7, 5, 9,
 10, 26; 267/153; 180/64; 308/26; 287/85

[56] References Cited
UNITED STATES PATENTS

| | | | |
|---|---|---|---|
| 2,001,562 | 5/1935 | Bagley | 248/7 |
| 3,108,830 | 10/1963 | Fierstine | (287/85UX) |
| 3,135,224 | 6/1964 | McLean | 248/9X |
| 3,194,614 | 7/1965 | Thomas | 308/26 |

Primary Examiner—Edward C. Allen
Assistant Examiner—J. Franklin Foss
Attorney—Ralph Hammar ABSTRACT: The service life of bonded elastomer trunnion mountings is improved by tapered annular grooves in the outer surfaces of the elastomer adjacent the split metal ring by which the mounting is seated in the trunnion support.

Patented May 25, 1971 3,580,532
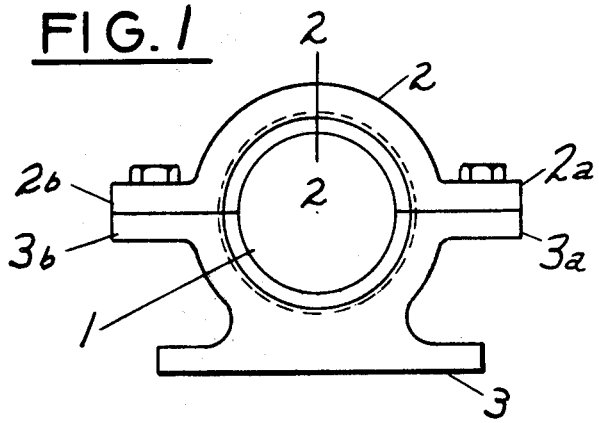
FIG. 1
FIG. 3
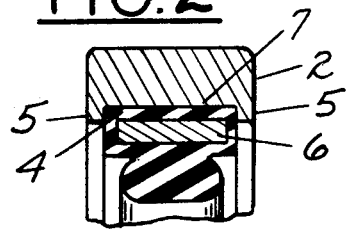
FIG. 2
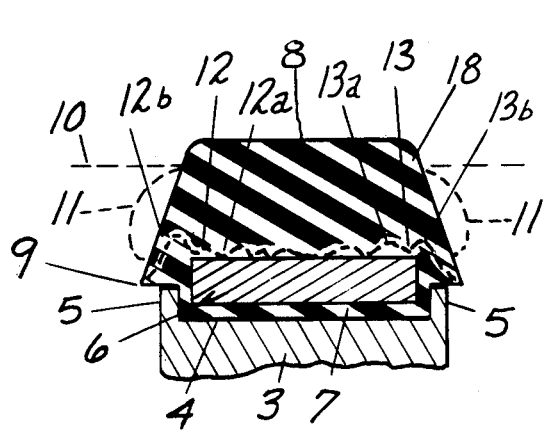
FIG. 5
PRIOR ART
FIG. 4
INVENTOR
Regis V Schmitt
BY Ralph Hammar
ATTORNEY

TRUNNION MOUNTING

In trunnion mountings of the type having a split metal ring seated in an annular socket in a supporting structure and bonded to an annular body of elastomer surrounding the trunnion shaft, when heavily loaded the elastomer has tended to fail in the region of the bond between the elastomer and the ring. This failure has started internally adjacent the outer edges of the metal ring and has spread axially both internally into the elastomer and externally toward the outer surface of the elastomer. The present invention delays the failure by annular tapered grooves extending axially inward from opposite ends of the elastomer beyond the region at which the failure starts, thereby eliminating the source of stress concentration.

In the drawing, FIG. 1 is an end view of a trunnion mounting assembly, FIG. 2 is an enlarged fragmentary section on line 2-2 of FIG. 1 with the trunnion removed, FIg. 3 is an end view of one of the halves of the resilient element of the mounting assembly, FIG. 4 is a section on line 4-4 of FIG. 3, and FIG. 5 is a view corresponding to FIG. 4 of a prior art mounting.

In a preferred form, a trunnion 1 is supported in a structure comprising a split housing having upper and lower members 2 and 3 each with outwardly projecting flanges 2a, 2b, 3a, 3b, which are bolted or otherwise suitably secured together. Each of the housing parts has an arcuate recess 4 with axially spaced inwardly extending flanges 5. When the housing parts are fastened together, the recesses and flanges 5 abut end to end and form an annular groove spaced radially outward from the trunnion. The resilient mounting element between the trunnion and housing comprises arcuate metal segments seated in the annular recesses 4 between the flanges 5 and arranged end to end about the axis of the trunnion. For the construction shown in FIG. 1, there would usually be two semicircular metal bands 6 respectively fitting the recesses 4 in the housing parts 2, 3 and abutting end to end when the housing parts were bolted or clamped together. When the annular recesses 4 are cast in the housing parts 2, 3, the metal bands 6 will usually have an outside diameter slightly less than the inside diameter of the recesses 4 and a width slightly less than the spacing between the flanges 5 and a skin 7 of elastomer bonded to the outer and end surfaces of the metal band will conform to the surface irregularities of the recesses. The yielding of the skin of elastomer accommodates surface irregularities and provides a tight seat between the metal segments 6 and the groove.

Bonded to each of the inner surfaces of the segments 6 is a body 8 of elastomer having an inside diameter less than the outside diameter of the trunnion so as to be placed under radial compression when the housing parts 2, 3 are bolted together with the trunnion 1. In accordance with the prior art, the body 8, as indicated in FIG. 5, was of generally trapezoidal cross section with the base 9 overlapping the flanges 5. When installed, the body 8 was compressed between the outer surface of the trunnion 1 indicated by dotted line 10, causing the sides of the body of the elastomer to bulge outwardly as indicated by dotted lines 11. The compression caused the inner surface of the elastomer 8 to be effectively anchored to the trunnion and the outer surface of the elastomer 8 to be effectively anchored to the housing. The section of the elastomer between the trunnion and the housing provides the resilient mounting.

With the prior art mounting construction as shown in FIG. 5, there is a tendency for failure to start in the regions indicated by 12 and 13. The failure starts because the elastomer is bulging causing a crease which creates a high stress concentration area. Once the failure starts, it progresses axially inward and outward along lines 12a, 13a and 12b, 13b. As the failure progresses, the elastomer is permitted to bulge further outwardly and the load carrying and isolation characteristics of the mounting deteriorate. The failure starts directly beneath the trunnion 1 because this is the most heavily loaded portion of the mounting. Once the failure has started, the elastomer rapidly deteriorates and the mounting must be replaced.

In order to increase the service life of the mounting, it is necessary to delay failure of the elastomer. When the failure is prevented, the elastomer is retained in its original position. Failure is prevented, as shown in FIG. 4, by tapered grooves 14 extending axially inward from opposite ends of the elastomer 15. The outer surface 16 of each groove 14 is formed by a skin of elastomer on the inner surface of the metal part 6. The inner surface 17 of each groove makes an acute angle with the surface 16 at the apex 18 of each groove and in a preferred form, flares outwardly with a generally increasing angle relative to the surface 16 and merges into end surface 19 of the elastomer 15. When installed in the housing 2, 3, the inner surface 20 of the elastomer 15 engages the outer surface of the trunnion indicated by the dotted line 10 and causes the elastomer to be placed under radial compression and to assume the shape indicated by dotted lines 21. It will be noted that in the installed position the inner ends of the grooves have been closed. The effect is the same as though the body of elastomer were rolled down, bringing the surfaces 17 into the contact with the surfaces 16 of the grooves. The region of greatest stress which is still at the outer part of the elastomer and generally in the regions indicated by the reference numerals 12 and 13 in FIG. 5, is remote from the bond between the elastomer and the metal part 6 so that the bond is protected by the section of elastomer between the apexes 18 of the grooves 14 and the dotted lines 21. Further, no crease is formed when load is applied to the part and therefore, because of the shape, the stress concentration found in the former design is eliminated. There is no place under normal operating conditions at which failure of the bond can start and the elastomer accordingly can not change in physical characteristics due to bond failure. The result is a significantly longer life since the elastomer is held in position and cannot deteriorate physically by being subject to tearing incident to failure. The surface 16 of the grooves 14 could be the inner surface of the metal part 6 but this would make the molding more difficult. It is easier to have a slight skin of elastomer over the inner surface of the metal part so that both sides 16, 17 of the grooves are of elastomer. The grooves 14 should be at an acute angle so that as the elastomer 15 is subject to radial compression when clamped between the housing parts 2, 3 and the trunnion 1 or loaded by an external load, the surfaces 17 of the grooves will close against the surfaces 16 of the grooves and thereby increase the load carrying area and prevent the substantial increase in transmission of stresses to the bond between the elastomer and the apexes 18 of the grooves. It is not necessary that the angle between the sides 16, 17 increase gradually from the apex as shown. The sides 16 and 17 could be straight if desired. The convex shape of the elastomer in the region indicated by the bracket 22 is not critical. The shape of the elastomer in this region does not enter significantly into the performance.

I claim:

1. A mounting comprising a housing having segmental parts secured together and having arcuate grooves arranged end to end and cooperating to provide an annular recess facing radially inward, a trunnion having an outer surface opposed to and spaced radially inward from said annular recess, a metal ring having segmental metal parts arranged end to end and seated in said recess, an annular body of elastomer comprising segments bonded to said metal parts, said body having an inside diameter less than the outside diameter of the trunnion whereby the elastomer is placed under radial compression between the trunnion and the metal parts, said elastomer at least in the region subjected to maximum load having annular grooves at opposite ends of the elastomer adjacent said metal parts with the apexes of the grooves spaced axially from each other and radially inward from the ends of the elastomer and with the side of the grooves diverging axially outward toward the ends of the elastomer at an acute angle whereby said radial compression of the elastomer causes the sides of the grooves to close at the apexes of the grooves and axially outward therefrom so as to protect the elastomer and said metal ring between the apexes of the grooves.

2. The mounting of claim 1 in which the metal parts are bonded to a skin of elastomer merging into said body.

3. The mounting of claim 1 in which the inner sides of the grooves in the elastomer diverge from the outer sides of the grooves at an acute angle which increases axially outward from the apexes of the grooves.

4. The mounting of claim 1 in which the body has end faces which are convex in radial cross section.